US010942349B2

(12) United States Patent
Ouderkirk et al.

(10) Patent No.: US 10,942,349 B2
(45) Date of Patent: Mar. 9, 2021

(54) ILLUMINATION ASSEMBLY WITH IN-FIELD MICRO DEVICES

(71) Applicant: Facebook Technologies, LLC, Menlo Park, CA (US)

(72) Inventors: Andrew John Ouderkirk, Redmond, WA (US); Karol Constantine Hatzilias, Kenmore, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/106,555

(22) Filed: Aug. 21, 2018

(65) Prior Publication Data

US 2020/0064627 A1 Feb. 27, 2020

(51) Int. Cl.
*G02B 27/00* (2006.01)
*G06F 3/01* (2006.01)
*G02B 27/01* (2006.01)

(52) U.S. Cl.
CPC ..... *G02B 27/0093* (2013.01); *G02B 27/0172* (2013.01); *G06F 3/013* (2013.01); *G02B 2027/0178* (2013.01)

(58) Field of Classification Search
CPC ............ G02B 27/0093; G02B 27/0172; G02B 2027/0178; G06F 3/013
See application file for complete search history.

(56) References Cited

U.S. PATENT DOCUMENTS

| 2003/0231293 | A1  | 12/2003 | Blum et al. |
| 2009/0219258 | A1* | 9/2009  | Geaghan .................. G06F 3/045 345/173 |
| 2012/0050682 | A1* | 3/2012  | Bonnin .................. A61B 3/113 351/210 |
| 2013/0114850 | A1* | 5/2013  | Publicover ............. H04N 5/247 382/103 |

(Continued)

FOREIGN PATENT DOCUMENTS

| EP | 2 226 703 A2 | 9/2010 |
| WO | WO 2017/186320 A1 | 11/2017 |

OTHER PUBLICATIONS

PCT International Search Report and Written Opinion, PCT Application No. PCT/US2018/051595, dated May 21, 2019, 17 pages.

(Continued)

*Primary Examiner* — Patrick N Edouard
*Assistant Examiner* — Eboni N Giles
(74) *Attorney, Agent, or Firm* — Fenwick & West LLP

(57) ABSTRACT

An illumination assembly includes a transparent substrate and a plurality of micro devices. The transparent substrate includes a first surface and a second surface opposite the first surface. The first surface includes a viewing region through which light passes prior to reaching an eyebox. The plurality of micro devices are coupled to respective conductive pathways that are affixed to the first surface. The plurality of micro devices including at least one micro device that is positioned within the viewing region. In some embodiments, the conductive pathways are arranged in a pseudo random (Continued)

manner. In some instances, the viewing region is composed of a circuity free region that is circumscribed by an outer region, and the plurality of micro devices are coupled to respective conductive pathways that are affixed to the first surface in the outer region.

19 Claims, 7 Drawing Sheets

(56) References Cited

U.S. PATENT DOCUMENTS

| | | | |
|---|---|---|---|
| 2013/0207911 A1* | 8/2013 | Barton | G06F 3/044 |
| | | | 345/173 |
| 2014/0152579 A1* | 6/2014 | Frey | G06F 3/0445 |
| | | | 345/173 |
| 2014/0152580 A1* | 6/2014 | Weaver | G06F 3/0446 |
| | | | 345/173 |
| 2014/0354953 A1 | 12/2014 | Chen et al. | |
| 2015/0169050 A1 | 6/2015 | Publicover et al. | |
| 2015/0289366 A1* | 10/2015 | Frey | G06F 3/0446 |
| | | | 174/250 |
| 2016/0379606 A1 | 12/2016 | Kollin et al. | |
| 2017/0038834 A1 | 2/2017 | Wilson et al. | |
| 2017/0115519 A1* | 4/2017 | Shi | G09G 5/10 |
| 2017/0116476 A1* | 4/2017 | Publicover | G06K 9/00604 |
| 2017/0205876 A1 | 7/2017 | Vidal et al. | |
| 2017/0219741 A1* | 8/2017 | Frey | G02B 1/116 |
| 2017/0255011 A1 | 9/2017 | Son et al. | |
| 2020/0150425 A1* | 5/2020 | Hatzilias | G02B 27/017 |
| 2020/0150426 A1* | 5/2020 | Hatzilias | H05K 1/0274 |

OTHER PUBLICATIONS

Extended European Search Report, European Application No. 19159199.9, dated Sep. 20, 2019, 7 pages.

* cited by examiner

ILLUMINATION ASSEMBLY WITH IN-FIELD MICRO DEVICES

BACKGROUND

The present disclosure generally relates to eye tracking systems, and specifically relates to an illumination assembly that includes in-field micro devices (e.g., sources and/or sensors).

Eye tracking systems track imaging light reflected off different regions of eyes thereby to track viewers' points of attention. For example, light reflected off corneas is used to track positions of eyes and reflected off irises is used to track positions of pupils. However, it is challenging to accurately track the users' points of attention. As one example, some users have small eye area which limits the cornea and/or iris area that can be imaged. As another example, it is difficult to accurately estimate gaze direction in systems with a wide field of view because several glint sources are used to generate light necessary for tracking the positions of the eyes over a wide range of angles.

Glint sources generating light for tracking the positions of the eyes are typically placed at the periphery of viewing optics that are outside the field of view of imaging displays. However, this limits the performance and accuracy of eye tracking systems, particularly for cases where the view of the users' eyes is limited or where the eyes are tracked over a wide range of angles.

SUMMARY

Described herein are substrates that are integrated with light in-field micro devices (e.g., micro-light emitting diodes and/or photodiodes) to form an assembly (e.g., an illumination assembly) for tracking movement over a target area. The target area includes one or both eyes of a user, and may also include a portion of the user's face that surrounds the one or both eyes (e.g., brow, cheek, etc.). In embodiments, where the micro devices are sources, light emitted by the light sources is reflected by the target area. The reflected light is detected and used for tracking movement of one or both eyes, and in some embodiments may be used to track movement of the portion of the user's face that surrounds the one or both eyes.

An assembly is an optical element that emits light via one or more sources. In some embodiments, the assembly has surfaces profiles such that it provides optical power (positive or negative). In other embodiments, the assembly has surface profiles such that it does not provide optical power. An assembly includes a transparent substrate and a plurality of micro devices. The plurality of micro devices includes a plurality of sources. In some embodiments, the plurality of micro devices may also include one or more sensors (e.g., photodiodes). In some embodiments, the plurality of micro devices include passive electronic components such as capacitors or resistors, active components such as transistors, diodes, and integrated circuits, or some combination thereof.

The transparent substrate includes a first surface and a second surface that is opposite the first surface. The first surface includes a viewing region through which light passes prior to reaching an eyebox. The plurality of micro devices are coupled to respective conductive pathways and are affixed to the first surface. And the plurality of micro devices include at least one micro device that is positioned within the viewing region. The conductive pathways may be arranged in different manners. In some embodiments, the conductive pathways are arranged in a pseudo random manner. In some embodiments, the viewing region is composed of a circuitry free region that is circumscribed by an outer region, and the plurality of micro devices are coupled to respective conductive pathways that are affixed to the first surface in the outer region.

Figure 1A:
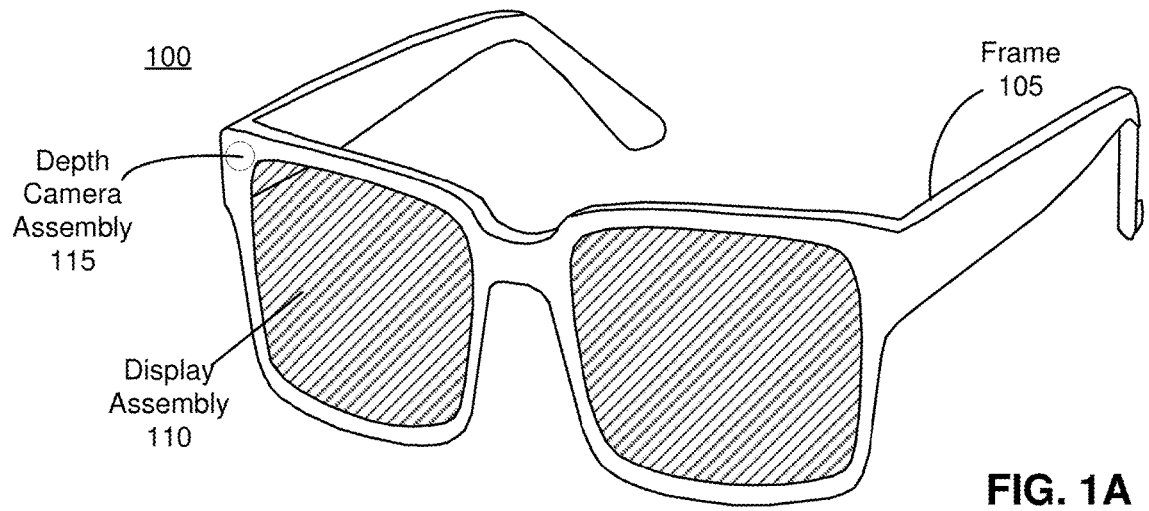
FIG. 1A is a diagram of a near-eye-display (NED), in accordance with one or more embodiments.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

An illumination assembly is part of a headset (e.g., a NED or head-mounted display) that is used to illuminate a portion of a user's face including one or both eyes (and in some cases portions of the face surrounding one or both eyes). The illumination assembly is positioned in the headset such at least a portion of the illumination assembly is within a field of view of an eye of a user wearing the headset. The illumination assembly includes a viewing region. The viewing region is a region of the illumination assembly through which light (e.g., from a display and/or a local area) passes prior to reaching an eyebox of the headset. The viewing region generally corresponds to a portion of the illumination assembly that is within a field of view of an eye of a user wearing the headset.

The illumination assembly includes a substrate and a plurality of micro devices that are coupled to the substrate. At least a portion of the substrate that is within the viewing region is transparent to light in a first optical band (e.g., visible light). The plurality of micro devices may be sources (e.g., micro-light emitting diodes (LEDs)), sensors (e.g., photodetectors), passive electronic components such as capacitors or resistors, active components such as transistors, diodes, and integrated circuits, or some combination thereof. There are some situations where it would be beneficial for the infield devices to be relatively large, but remain transparent. Such as a capacitor, it may not be possible to design a micro-sized capacitor that meets capacitance requirements, but it is feasible to create a large (1 mm diameter) transparent capacitor that could also be in field. This would be beneficial if, for example, there is an amplification circuit near the photodiode.

A source emits light in a second optical band (e.g., infrared light and/or near infrared). In some embodiments, a sensor detects light in the second optical band.

The plurality of micro devices are controlled (and powered) using a plurality of conductive pathways. A conductive pathway comprises one or more conductive traces that are coupled to a surface of the substrate. In some embodiments, a micro device may be coupled to a conductive pathway that include two conductive traces (e.g., a signal/power lead and a ground lead). In some embodiments the conductive pathways for each micro device include a single conductive trace, but are all conducted to a transparent conductive layer (e.g., acts as a ground plane). In some embodiments, conductive pathways and at least one micro device form a multilayer circuit. In a multilayer circuit at least a portion of two different conductive pathways may overlap. At a point of overlap a micro device may be placed at the location of overlap, or the two different conductive pathways may be electrically isolated from each other. In some embodiments, the multilayer circuit can include multiple layers of patterns of conductive pathways and micro-devices that overlap one or more large transparent conductors (e.g., large ground plane).

The plurality of conductive pathways are transparent over at least the viewing region. The plurality of conducive pathways have an arrangement on the substrate. The arrangement may be, e.g., angled, radial, pseudo-random, etc.

Note that while the plurality of conductive pathways are transparent over the viewing region, under some lighting conditions they can become partially visible to a user. A human eye is generally more sensitive to straight lines and certain repeating patterns than it is to a randomized (or pseudo-randomized) pattern. A pseudo-random arrangement of the conductive pathways helps mitigate the conductive pathways becoming visible to the user. Accordingly, arranging the conductive pathways in a pseudo-randomized manner uses the inherent operation of the eye to help mitigate visibility of the conductive pathways. Similarly, an arrangement of the conductive pathways in a manner that mimics vasculature of the human eye also can help mitigate visibility of the conductive pathways. Note that there are some repeating patterns (e.g., circle or line with a sinusoidal pattern added to it) that can be difficult to see by the human eye, and the conductive pathways can also be arranged in these patterns.

Moreover, a user looks generally straight ahead most of the time while wearing a headset. In some embodiments, the viewing region is composed of a circuitry free region that is circumscribed by an outer region. The circuitry free region is the region of the illumination assembly that does not include any micro devices and their respective conductive pathways. The circuitry free region is placed such that a user wearing the headset who is looking substantially straight ahead is looking through the circuitry free region. The plurality of micro devices and their respective conductive pathways are placed in the outer region. Note that in this embodiment, a fovea (high detail) has a field of view that is free from micro devices and conductive pathways, and the non-foveal region (much lower resolution) is the region that would have micro devices and conductive pathways in its field of view. Accordingly, the circuitry free region greatly mitigates detection of the conductive pathways (and micro devices) by the user.

Various embodiments may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

FIG. 1A is a diagram of a near-eye-display (NED) 100, in accordance with one or more embodiments. The NED 100 presents media to a user. Examples of media presented by the NED 100 include one or more images, video, audio, or some combination thereof. In some embodiments, audio is presented via an external device (e.g., speakers and/or headphones) that receives audio information from the NED 100, a console (not shown), or both, and presents audio data based on the audio information. The NED 100 is configured to operate as an artificial reality NED. For example, the NED 100 may operate as a VR NED, an AR NED, a MR NED, or some combination thereof.

The NED 100 shown in FIG. 1A includes a frame 105, a display assembly 110, and optionally includes one or more depth camera assemblies (DCAs) 115. The frame 105 is coupled to one or more optical elements which together display media to users. In some embodiments, the frame 105 may represent a frame of eye-wear glasses. The display assembly 110 is configured for users to see the content presented by the NED 100. The DCA 115 determines depth information for objects in a local area around the NED 100. The DCA 115 is discussed in detail below with regard to FIG. 6. Note that while the DCA 115 is shown in a particular location on the NED 100, in other embodiments, the DCA 115 may be located elsewhere on the NED 100 and/or may include additional cameras.

Figure 1B:
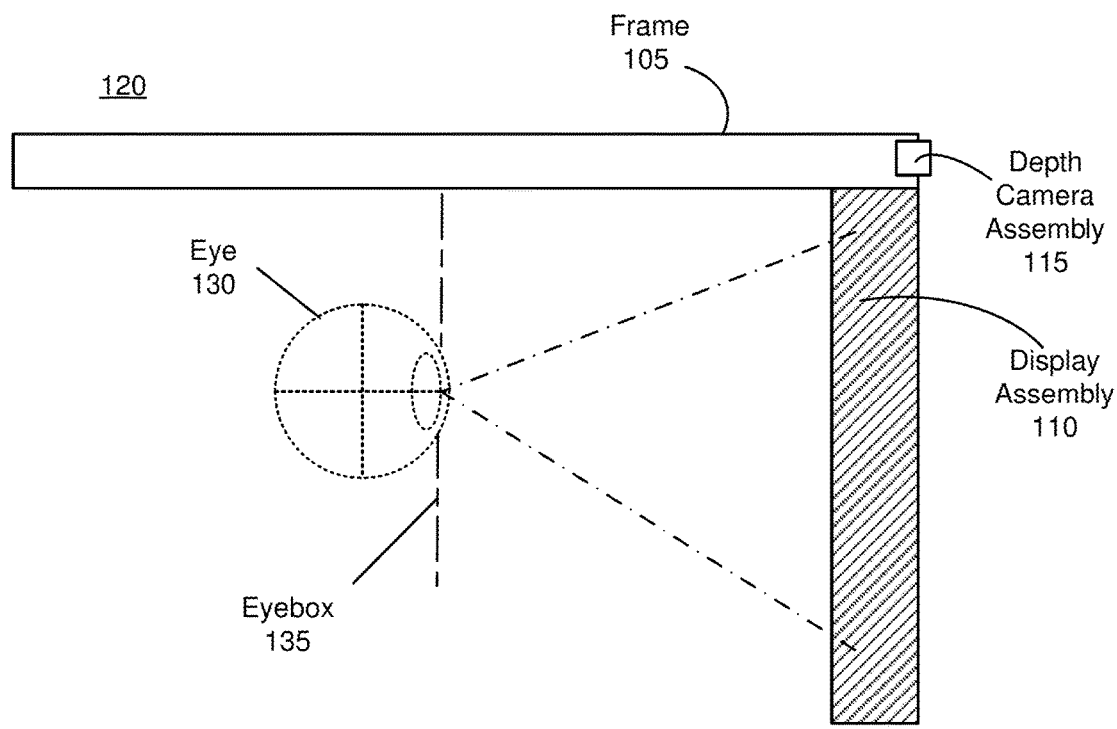
FIG. 1B is a cross-section of the NED illustrated in FIG. 1A, in accordance with one or more embodiments.

FIG. 1B is a cross-section 120 of the NED 100 illustrated in FIG. 1A, in accordance with one or more embodiments. The display assembly 110 presents content to an eye 130. An eye box 135 is a location where the eye 130 is positioned when the user wears the NED 100. For purposes of illustration, FIG. 1B shows the cross section 115 associated with a single eye 130 and a display assembly 110, but in alternative embodiments not shown, another display assembly which is separate from the display assembly 110 shown in FIG. 1B, provides image light to an eye box located at an exit pupil of another eye of the user.

The display assembly 110 includes a display, an optics block, and an eye tracking system. While not shown, in some embodiments, portions of the display, the optics block, the eye tracking system, or some combination thereof, may be positioned outside of the display assembly 110. For example, a controller of the eye tracking system may be embedded in the frame 105.

The display emits content that is provided to the user via the optics block. The optics block directs content from the display to the eyebox 135. The optics block directs the content using an illumination assembly. In some embodiments, the optics block also includes one or more optical elements (e.g., a lens).

The illumination assembly is composed of a substrate that transmits light in a first optical band (e.g., visible light) emitted by the display. A plurality of micro devices are coupled to the substrate. The plurality of micro devices includes a plurality of sources (e.g., micro-LEDs). In some embodiments, the plurality of micro device may also include one or more sensors (e.g., photodetectors). And the plurality of micro devices are powered and/or controlled using one or more conductive pathways. As discussed below with regard to FIG. 2, the eye tracking system causes the plurality of sources to emit light in a second optical band (e.g., infrared light and/or near infrared light) that is different than the first optical band. The plurality of sources illuminate a target area. The target area includes one or both eyes of the user, and in some embodiments may include portions of the face that surround one or both eyes of the user (e.g., brow, cheek, etc.). The eye tracking system captures images of the illuminated area, and uses the captured images to determine tracking information. The display, the optics block, and the eye tracking system are described in detail below with regard to FIG. 2.

Figure 2:
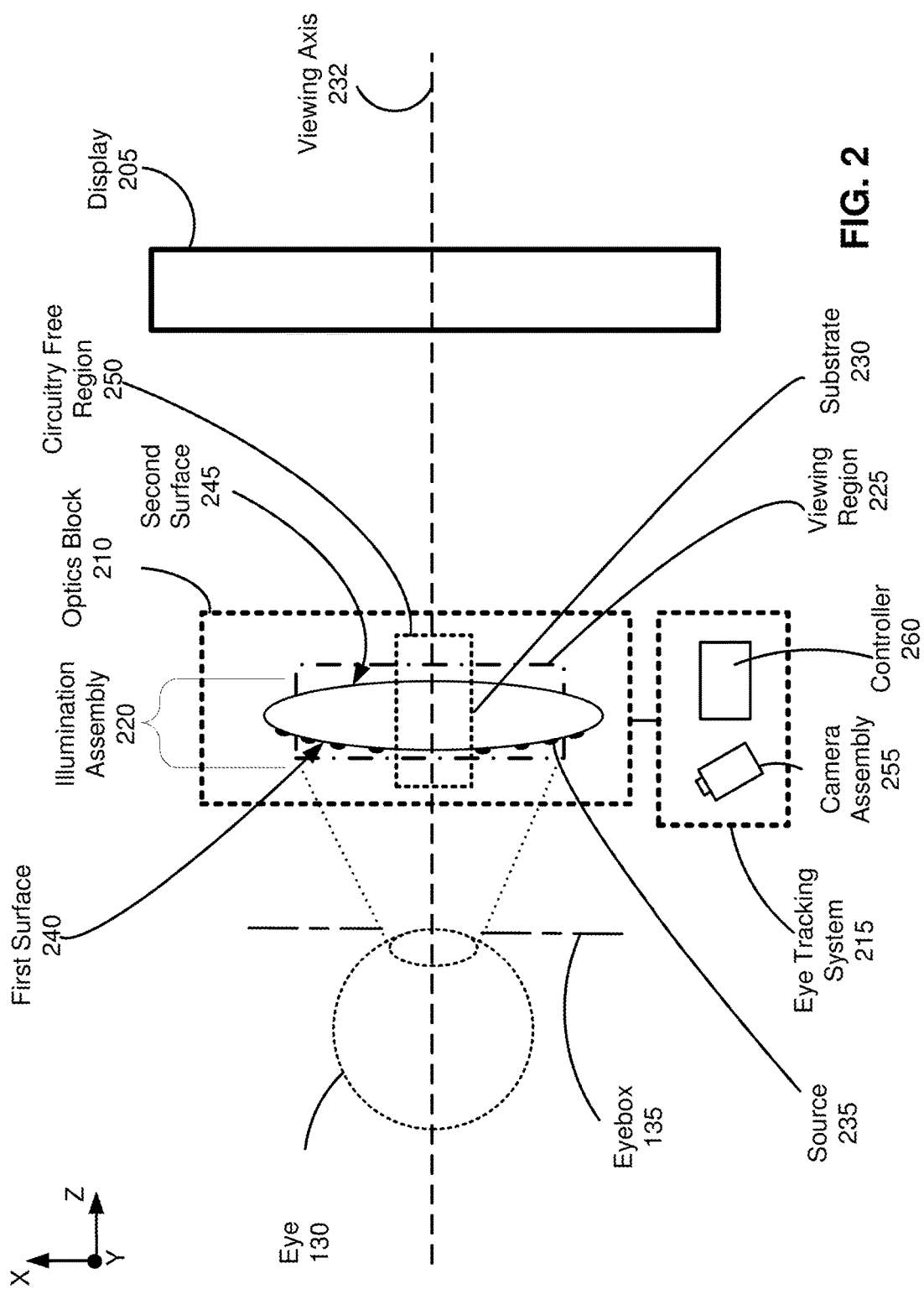
FIG. 2 a portion of a display assembly, according to one or more embodiments.

FIG. 2 a portion of a display assembly 200, according to one or more embodiments. The display assembly 200 may be the display assembly 110, a display assembly that is part of a head-mounted display (HMD), a display assembly in some other NED, etc. The display assembly 200 includes a display 205, an optics block 210, and an eye tracking system 215. Some embodiments of the display assembly 200 have different components than those described here. Similarly, the functions can be distributed among the components in a different manner than is described here.

The display 205 displays images and/or video to the user as a generated by the HMD 100 or another device. In various embodiments, the display 205 may comprise a single display or multiple displays (e.g., a display for each eye of a user). Examples of possible elements in the display 205 include: a liquid crystal display (LCD), an organic light emitting diode (OLED) display, an active-matrix organic light-emitting diode display (AMOLED), a quantum organic light emitting diode (QOLED) display, a quantum light emitting diode (QLED) display, a transparent organic light emitting diode (TOLED) display, some other electronic display, a waveguide, a scanning assembly (e.g., a scanning mirror), or some combination thereof. In some embodiments, the display 205 is a waveguide display.

The optics block 210 directs light that is in a first optical band to the eyebox 135. The light is in the first optical band and includes light emitted by the display 205. In some embodiments (e.g., an AR and/or MR NED), some or all of the display 205 is transparent and light from a local area surrounding the NED 100 is transmitted through the display 205 and the optics block 210 to the eyebox 135. In these embodiments, one or more optical elements may be placed between the display and the local area to offset optical power added by the optics block 210 to light from the local area. Additionally, in some embodiments, at least one of the one or more optical elements may be able to dynamically adjust its optical power (e.g., a liquid lens).

The optics block 210 includes at least an illumination assembly 220, and may include one or more additional optical elements and/or combinations of different optical elements. For example, an optical element is an aperture, a Fresnel lens, a convex lens, a concave lens, a liquid crystal lens, a liquid lens, a filter, or any other suitable optical elements that affects the image light emitted from the electronic display 205. In some embodiments, one or more of the optical elements in the optics block 210 may have one or more coatings, such as anti-reflective coatings. In some embodiments, the optics block 210 magnifies received image light from the display 205, corrects optical errors associated with the image light, and presents the corrected image light to the eyebox 135. The eyebox 135 is a location in space that would be occupied by the eye 130 of a user of the NED 100.

The illumination assembly 220 is used to illuminate a target area in accordance with instructions from the eye tracking system 215. The target area is a portion of a user's face including one or both eyes (and in some cases portions of the face surrounding one or both eyes). The illumination assembly 220 is positioned in the NED such at least a portion of the illumination assembly 220 is within a field of view of the eye 130. The illumination assembly 220 includes a viewing region 225. The viewing region 225 is a region of the illumination assembly 220 through which light (e.g., from the display 205 and/or a local area) passes prior to reaching the eyebox 135. The viewing region 225 generally corresponds to a portion of the illumination assembly 225 that is within a field of view of the eye 130.

In this embodiment, the illumination assembly 220 includes a substrate 230 and a plurality of micro devices that are coupled to the substrate 230. The plurality of micro devices may be sources, sensors, passive electronic components such as capacitors or resistors, active components such as transistors, diodes, and integrated circuits, or some combination thereof. As noted above, there are some situations where the micro-devices are not micro in the traditional sense—and are relatively large and transparent (e.g., a large (1 mm diameter) transparent capacitor). In the illustrated embodiment, the plurality of micro devices includes a plurality of sources, and may include one or more sensors. For ease of illustration a single source 235 of the plurality of sources is labeled in FIG. 2.

The substrate 230 is a material that is at least substantially transparent over the viewing region 225 in the first optical band (e.g., visible light). The substrate 230 may be composed of, e.g., glass, plastic, some other material that is transparent to light in the first optical band, or some combination thereof. Note in some embodiments, the substrate 230 may also be transparent in the second optical band. The substrate 230 may be opaque to the first optical band in areas outside of the viewing region 225.

The substrate 230 has a first surface 240 and a second surface 245. The first surface 240 and the second surface 245 have respective surface profiles. A surface profile may be, e.g., spherical, aspherical, flat, freeform, convex, concave, some other shape, or some combination thereof. The first surface 240 and the second surface 245 may have different or the same surface profiles. Note that while the illustrated embodiment, shows both the first surface 240 and the second surface 245 with curved surface profiles, in other embodiments, one or both of the surface profiles may be different. For example, the first surface 240 and the second surface 245 may both have flat surface profiles so that no optical power is imparted to the system. Moreover, in embodiments not illustrated in FIG. 2, the functionality of the illumination assembly 220 and the functionality of the display 205 are combined into a single component. For example, the substrate 230 may act as an output waveguide of a wave guide display. Some example waveguide displays and output waveguides are discussed further in, e.g., U.S. application Ser. No. 15/704,190, which is incorporated by reference in its entirety.

In the illustrated embodiment, the plurality of micro devices are coupled to the first surface 245. As noted above, in this embodiments, the plurality of micro devices includes a plurality of sources, and also may include one or more sensors. The plurality of sources emit light into the target area. A source emits light in a second optical band. A source may be, e.g., a micro-LED, a Vertical Cavity Surface Emitting Laser (VCSEL), a laser diode, a super radiant LED, an OLED, a micro LED, or a combination thereof. The plurality of sources includes at least 10 sources, and generally includes more than 10 (e.g., 20, 30, etc.). A sensor may be, e.g., a photodetector based on silicon, GaAs, InGaAs, AlInGaP, other inorganic or organic semiconductors, or combination thereof, a sensor sensitive to light in the second optical band, a sensor sensitive to light in the first optical band, or some combination thereof. The sensor may be used to, e.g., monitor brightness of light in the first optical band from the display 205, from the local area (e.g., in an AR and/or MR embodiment), determine the angle of light reflecting from the cornea of a user's eye, etc.

A micro device has a length and a width in the range of 1 μm to 1000 μm. In some embodiments, the length and/or the width of a micro device are between 1 μm and 250 μm. In some embodiments, the length and/or the width of a micro device are between 1 μm and 100 μm. In general, each of the micro devices are quite small to mitigate visibility of a micro device to a user of the NED 100. In other embodiments, the plurality of micro devices are coupled to one or both of the first surface 240 and the second surface 245. The plurality of micro devices are coupled to a surface of the substrate 230 such that light from the plurality of sources is emitted toward the eyebox 135. The plurality of micro devices are distributed across a surface of the substrate 230 such that some or all of them are in-field. A micro device that is in-field is located within the viewing region 225. Note in some embodiments, at least one of the micro devices (e.g., a source or a sensor) is positioned outside of the viewing region 225.

The plurality of sources are distributed across the first surface 240 and/or the second surface 245, such that light emitted by the plurality of sources forms a pattern on the target area. In embodiments, where a source is coupled to the first surface 240, light emitted from the source reaches the eyebox 135 without passing through the transparent substrate 230. In some embodiments, some or all of the plurality of sources are bottom emitting flip chip VCSELs with a uniform encapsulation layer on top of the VCSELs, the circuit, and the first surface (240). The encapsulation would create another uniform surface closer to the eye 130. Embedded within that encapsulation layer or etched into the surface of the encapsulation layer are optics to aim and shape the VCSELs to ensure uniform and full illumination of the eye box. In other embodiments, an optic is mounted directly to a top of a VCSEL, and the optic aims and shapes the output of the VCSEL. In some embodiments, some or all of the VCSELs are mounted at an angle by creating a wedge in either the material that bonds the VCSEL to the first surface 240 or by making a trench in first surface 240.

An example distribution of the plurality of sources is shown in FIGS. 3A-3D below. In some embodiments, some or all of the plurality of sources have a unique (or at least a partially unique) spatial configuration. A spatial configuration describes how a source is positioned relative to adjacent sources. Note that some artificial reality devices do not have very rigid frames and therefore online (or active) calibration of the eye tracking system may be required. In some embodiments, for these non-rigid artificial devices, the plurality of sources may be positioned such that some of the light output from some or of the plurality of sources directly goes to a camera of the eye tracking system 215. This captured light may help account for motion due to the non-rigid frame. In some embodiments, the spatial configuration of the plurality of sources may include one or more patterns that are intentionally visible to the eye tracking system 215 within a conductive pathway or a surface of the illumination assembly 220 that is not connected to the conductive pathway.

The plurality of sources can be divided into subsets of sources, where each subset of sources has a unique spatial configuration relative to other subsets of sources. For example, one subset of sources may be arranged in a triangle, a different subset in a line, etc. Moreover, as discussed below, in some embodiments no micro device (and corresponding conductive pathway) is placed within a circuity free region 250 of the viewing region 225.

In some embodiments, some or all of the substrate 220 is coated with a coating layer. The coating layer is transparent in the first optical band, and at least partially encloses at least some of the plurality of devices and the transparent substrate. In some embodiments, one or more of the plurality of sources are partially enclosed by an infrared light (IR) absorber. The IR light absorber blocks light leakage from the source. That is, the IR light absorber prevents light emitted from the source to propagate along predetermined directions (e.g., towards the display 205).

The plurality of sources emit light in a second optical band (e.g., infrared light). In some embodiments, the second optical band is near-infrared light of a wavelength in the range of between 780 and 1100 nm (nanometer). In some embodiments, the second optical band is a wavelength in the range of between 800 and 1000 nm. And in some embodiments, some and/or all of the plurality of sources emit light in different portions of the second optical band than other sources of the plurality of sources. Additionally, in some embodiments, one or more of the plurality of sources may be emit coded light in accordance with instructions from the eye tracking system 215. Coded light is light that allows for unique or partially unique identification of a particular source. The plurality of sources may emit coded light, by, e.g., emitting light at different wavelengths, emitting light at different polarizations, emitting light at different modulations (e.g., amplitude, pulse, etc.), as part of different spatial configurations (e.g., a location of the source is placed relative to adjacent sources), some other emission of light that allows for unique or partially unique identification of a source, or some combination thereof.

The plurality of micro devices are controlled (and powered) using a plurality of conductive pathways (not shown). As at least some of the plurality of micro devices are in-field, at least some of the conductive pathways overlap the viewing region 225. A conductive pathway comprises one or more conductive traces that are coupled to a surface of the substrate. A conductive pathway may couple to one or more micro devices. In some embodiments, one or more micro devices (e.g., sources) may be coupled to a conductive pathway that include two conductive traces (e.g., a signal/power lead and a ground lead). In some embodiments, micro devices may be independently controller via one or more conductive pathways. In some embodiments the conductive pathway for a micro device includes a single conductive trace, and the micro device is also coupled to a transparent (in at least the first optical band) conductive layer (e.g., acts as a ground plane). For example, some or all of the plurality of micro devices may have a respective single conductive trace and also be coupled to a transparent conductive layer that is common to the some or all of the plurality of micro devices. In some embodiments, the conductive pathways and the plurality of micro devices form a multilayer circuit. For example, the conductive pathways may be arranged in multiple layers (that are substantially transparent to light in the first optical band), and in some embodiments, one of the layers may be coupled to a transparent conductive layer that is common to the some or all of the micro devices.

The plurality of conductive pathways are designed with the goal of being functionally invisible to a user of the NED 100. The conductive pathways may be transparent in the first optical band, opaque in the first optical band, and/or partially transparent in the first optical band. Visibility of the conductive pathways are mitigated using, e.g., transparent or substantially transparent (at least over the first optical band) conductive pathways within the viewing region 225, narrow conductive pathways, arrangement of the conductive pathways, or some combination thereof. For example, the plurality of conductive pathways are composed of a conductive material that is transparent over the first optical band over at least the viewing region 225 which mitigates visibility of the conductive pathways during operation of the NED 100. An opaque conductive pathway may be positioned outside the viewing region 225. The conductive material may be, e.g., indium tin oxide (ITO), transparent conductive oxide (TCO), fluorine doped tin oxide (FTO), some other material that is conductive and transparent to the first optical band, or some combination thereof. Additionally, a width of the conductive pathways are typically quite small (e.g., less than 50 μm wide), which also helps mitigate visibility of the conductive pathways during operation of the NED 100.

The plurality of conducive pathways have an arrangement on the substrate 230. The arrangement may be, e.g., angled, radial, curved, pseudo-random, some other arrangement (e.g., mimic vasculature of human eye), or some combination thereof. Some example arrangements of the conductive pathways are illustrated below with regard to FIGS. 3A-D.

Note that while the plurality of conductive pathways are transparent over the viewing region 225, under some lighting conditions they can slightly degrade quality of the content being presented to the user and in some cases become partially visible. A pseudo-random arrangement of the conductive pathways helps mitigate the conductive pathways becoming visible to the user. The eye 130 is generally more sensitive to straight lines and repeating patterns than it is to a randomized (or pseudo-randomized) pattern. Accordingly, arranging the conductive pathways in a pseudo-randomized manner uses the inherent operation of the eye 130 to help mitigate visibility of the conductive pathways.

Note that adding local orientation/phase changes to the arrangement of conductive pathways can result in a distribution of spectral power across a larger bandwidth, which can reduce correlated neural firing such that the conductive pathways are less visible to the eye. This is one reason why, e.g., a pseudo-random arrangement, is less visible to the eye relative to arrangement of straight lines or a pure curve. For example, Fast Fourier Transform (FFT) analysis of a wavy circle (e.g., a circle where random jitter is introduced with weighted momentum along the path of the circle) relative to a FFT analysis of a circle results in a redistribution of the spectral power to a larger bandwidth, particularly in the lower spatial frequencies. Accordingly, a conductive pathway arranged in the wavy circle would be less visible to the eye than a conductive pathway arranged in circle.

Moreover, a user looks generally straight ahead most of the time while wearing a headset (e.g., a HMD or NED). A viewing axis 232 corresponds to an axis that a user who is looking substantially straight ahead while wearing the NED 100 generally looks along. In some embodiments, the viewing axis 232 corresponds to an optical axis of the display assembly 200. In the illustrated embodiment, the viewing region 225 is composed of a circuitry free region 250 that is circumscribed by an outer region. The outer region, while not labeled in the figure, is simply the region of the substrate that is not part of the circuitry free region 250. The circuitry free region 250 is a region of the illumination assembly 220 that does not include any micro devices and their respective conductive pathways and is centered along the viewing axis 232. The circuitry free region 250 may be any shape (e.g., circular, rectangular, etc.). The circuitry free region 250 is placed such that a user wearing the NED 100 who is looking substantially straight ahead is looking through the circuitry free region 250.

The plurality of micro devices and their respective conductive pathways are placed in the outer region. Note that in this embodiment, a fovea (high detail) of the eye 130 has a field of view that is free from micro devices and conductive pathways, and the non-foveal region (much lower resolution) of the eye 130 has a field of view that would have micro devices and conductive pathways. As noted above, a user of the NED 100 typically looks straight ahead, or more precisely within a threshold distance of a straight ahead view. Accordingly, the circuitry free region greatly mitigates detection of the conductive pathways (and micro devices) by the user by simply removing the micro devices and their conductive pathways from the areas of the substrate 220 that are most commonly viewed by the fovea of the eye 130.

The eye tracking system 215 tracks a position of the eye 135. The eye tracking system 215 comprises a camera assembly 255 and a controller 260. Although FIG. 2 only shows one eye 130 of the user. In some embodiments, separate eye tracking systems may be implemented for each eye of the user.

The camera assembly 255 captures images of a light pattern reflected from the target area. The light pattern is formed from the light in the second optical band emitted from at least some of the plurality of sources. The reflected light includes, e.g., reflections of a light pattern from portions of the eye 130 (e.g., cornea, iris, and/or sclera) in the target area, and may include portions of the face (e.g., brow, nose, cheek, etc.) surrounding the eye 130. The camera assembly 255 includes one or more cameras that are sensitive to light in at least the second optical band. In some embodiments, the one or more cameras may also include at least one camera that captures images in the first optical band (and in some cases it may also capture light in the second optical band). A camera may be, e.g., an array (1D or 2D) of photodiodes, a charge coupled display (CCD) array, a complementary metal oxide semiconductor (CMOS)

array, some other device capable of capturing reflected light over the target area in at least the first optical band, or some combination thereof. In some embodiments, the camera assembly 255 includes one or more polarization sensitive cameras that are able to capture polarization information. Polarization information describes a polarization of the captured light. For example, a polarization sensitive camera comprises an array of polarization sensitive pixels (e.g., 0°, 45°, 90°, and 135°). The camera assembly 255 captures the images in accordance with instructions generated by the controller 260.

Note that while the camera assembly 255 is shown in FIG. 2 as directly imaging the target area, in other embodiments, the camera may image the target area through one or more optical elements of the optics block 210. For example, the optics block 210 can include a hot mirror (i.e., reflective in the second optical band and transparent in the first optical band) between the illumination assembly 220 and the display 205. In this embodiment, light in the second optical band reflects from the target area back toward the illumination assembly 220. The reflected light would be transmitted by the illumination assembly 220 and then be directed toward the camera assembly 255 via the hot mirror.

The controller 260 controls components of the eye tracking system 215 and the plurality of micro devices of the illumination assembly 220. The controller 260 generates instructions for the plurality of micro devices (i.e., the plurality of sources, and in some embodiments, one or more sensors) of the illumination assembly 220 and the camera assembly 255. The controller 260 may generate instructions such that the plurality of sources emit a pattern over some or all of the target area. The pattern may be, e.g., a structured light pattern. The controller 260 may generate instructions such that the light emitted by some or all of the plurality of sources is coded. The controller 260 instructs the camera assembly 255 to capture images of the target area.

The controller 260 receives one or more images of the user's eye 130 captured by the camera assembly 255. The controller 260 determines tracking information using one or more captured images from the one or more cameras of the camera assembly 255. Tracking information describes at least a position (inclusive of orientation) of one or both eyes of a user of the NED 100. Tracking information can include, e.g., position of an eye, gaze angle, inter-pupillary distance, position of one or more facial features (e.g., brow, cheek, etc.) that surround one or both eyes, or some combination thereof. For example, in some embodiments, the controller 260 identifies locations of reflections of light from at least some of the plurality of sources in an image of some portion of the target area. The image includes the eye 130 and may also include portions of facial features surrounding the eye 130. The controller 260 determines a position (inclusive of orientation) of the eye 130 based on the shape and/or locations of the identified reflections. The controller 260 may also be configured to determine a position of facial features based on the shape and/or locations of the identified reflections. In cases where the target area is illuminated with a structured light pattern, the controller 260 can detect distortions of the structured light pattern projected onto the target area, and can estimate a position and an orientation of the eye 130 based on the detected distortions. In some embodiments, the controller 260 can also estimate a position of facial features surrounding the eye 130. The controller 260 can also estimate a pupillary axis, a gaze angle (e.g., corresponds to a foveal axis), a translation of the eye, a torsion of the eye, and a current shape of the eye 130 based on the image of the illumination pattern captured by the camera assembly 255. The controller 260 may provide some or all of the tracking information to, e.g., the display 205 (e.g., for foveated rendering) and/or to a varifocal module.

A varifocal module (not shown) mitigates vergence-accommodation conflict by adjusting a location of an image place. A varifocal module controls one or more varifocal elements. A varifocal element is an optical element that may be adjusted to vary a location of an image plane (i.e., where virtual content appears to a wearer of the NED 100). The adjustment may be, e.g., by adjusting an optical power of the optical element and/or adjusting a position of the optical element relative to the display element 110. In some instances the illumination assembly 220, an optical element in the optics block 210, the display 205, some other optical element (e.g., one to offset optical power provided by the optics block 210), or some combination thereof, are varifocal elements. For example, the illumination assembly 220 and/or the display 205 may be part of a varifocal module that adjusts a relative distance between the illumination assembly 220 and the display 205. The varifocal element may be coupled to the eye tracking system 215 to obtain tracking information determined by the eye tracking system 215. The varifocal element adjusts a location of the image plane by adjusting the relative distance between the illumination assembly 220 and the display 205. The adjustment of the image plane such that a vergence location and an accommodation location are at the image plane act to mitigate vergence-accommodation conflict.

Note that conventional eye tracking systems may have limited eye tracking abilities because the location of illumination sources for the eye tracking system are outside of a user's field of view of the entire display. Positioning the illumination sources outside of the field of view of the user (i.e., the viewing region 225) results in very oblique illumination of eye. And very oblique illumination of the user's eye may result in, e.g., insufficient illumination of the eye. Additionally very oblique illumination of the user's eye may limit the pattern and structure of the illuminating light, thus reducing the flexibility of the eye tracking system design, which relies in part on the structure of extracted light to detect information about the user's eye. In contrast, the illumination assembly 220 uses in-field sources that illuminate the target area over a much lower range of angles. Moreover, as the sources are placed in-field it can allow for a potentially higher density of sources (over the viewing region 225) relative to a density of sources in conventional systems (along a periphery that is outside the viewing region 225).

Figure 3A:
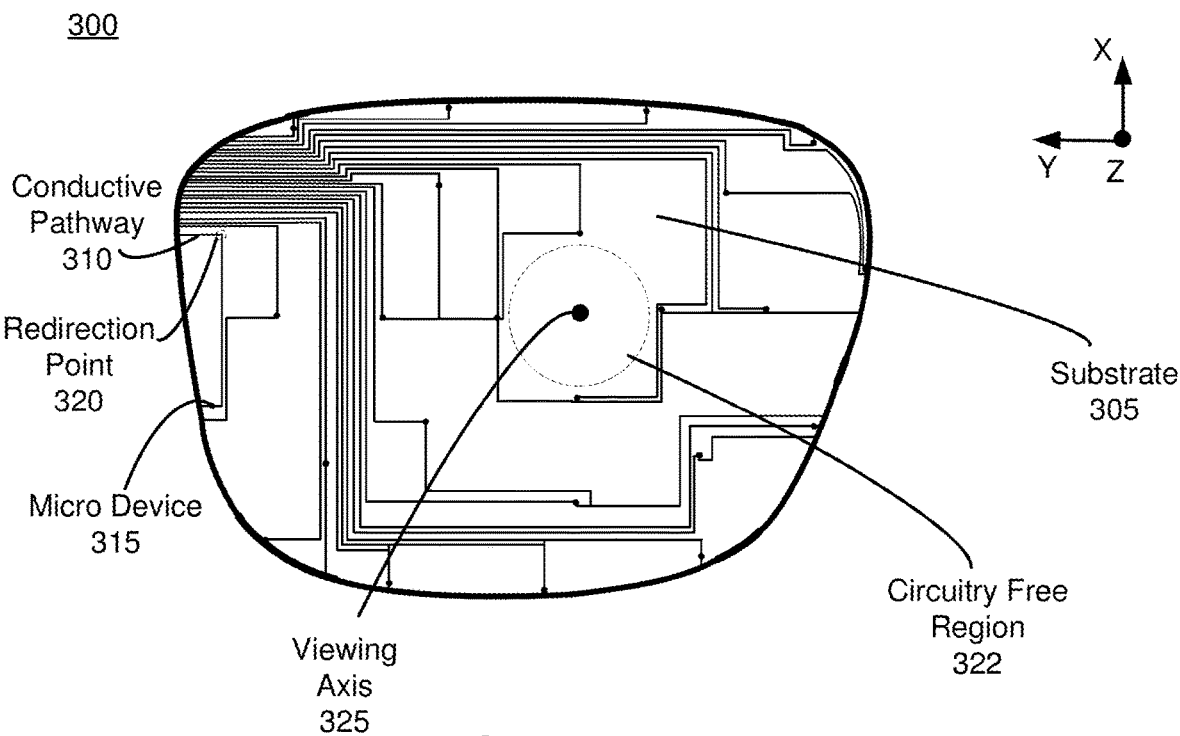
FIG. 3A is a plan view of an example illumination assembly with conductive pathways in an angled arrangement, according to one or more embodiments.

FIG. 3A is a plan view of an example illumination assembly 300 with conductive pathways in an angled arrangement, according to one or more embodiments. The illumination assembly 300 includes a substrate 305 and a plurality of micro devices that are coupled to the lens substrate 305. The substrate 305 is an embodiment of the substrate 230. The plurality of micro devices are illustrated as black dots, and are substantially the same as those discussed above with regard to FIG. 2. For example, the plurality of micro devices may include a plurality of sources that emit light in second optical band, a plurality of sensors (e.g., detect light in the second optical band), or some combination thereof. Additionally, in some embodiments, some or all of the plurality of sources may be replaced with sensors that detect light. In other embodiments, the illumination assembly 300 may include some other number of micro devices (e.g., more or less).

The illumination assembly 300 may include a circuitry free region 322. The circuitry free region 322 that does not include any micro devices and their respective conductive pathways. The circuitry free region 322 is centered along a viewing axis 325. The viewing axis 325 corresponds to an axis that a user who is looking substantially straight ahead looks along. In some embodiments, the viewing axis 325 corresponds to an optical axis of the illumination assembly 300. Additionally, some or all of the plurality of micro devices may be located on different portions of the illumination assembly 300. For example, in alternate embodiments, the illumination assembly 300 (and other illumination assemblies discussed herein) may not include a circuitry free region 322.

The plurality of micro devices are controlled (and powered) using a plurality of conductive pathways that have an angled arrangement. The conductive pathways are substantially the same as described above with regard to FIG. 2, except they are in an example of an angled arrangement. An angled arrangement describes a conductive pathways that are straight lines and may have one or more sudden changes in direction at corresponding redirection points. For example, in FIG. 3A, a conductive pathway 310 including a source 315 has a change of direction at a redirection point 320. All redirection points result in an angle being formed between adjacent portions (also referred to as "segments") of the conductive pathway on either side of the redirection point. In the embodiment, of FIG. 3A, the angle is a right angle, but in other embodiments, the angle may be something other than a right angle. Moreover, in some embodiments, different redirection points may form different angles. The different direction points may be on the same or different conductive pathways.

The plurality of micro devices are in-field (i.e., within a viewing region) and are distributed across the substrate 305. In embodiments, where the plurality of micro devices are sources, the plurality of sources therefore can illuminate the target area over a much lower range of angles than, e.g., sources positioned around and outside of the illumination assembly 300 (e.g., as would be the case for conventional systems). Moreover, as the micro devices are placed in-field it can allow for a potentially higher density of micro devices (over the viewing region) relative to a density of micro devices in conventional systems (along a periphery that is outside the viewing region 225). This can result in a denser structured light pattern, which can provide increased angular data used for tracking the gaze angle of the user's eye over the target area.

Figure 3B:
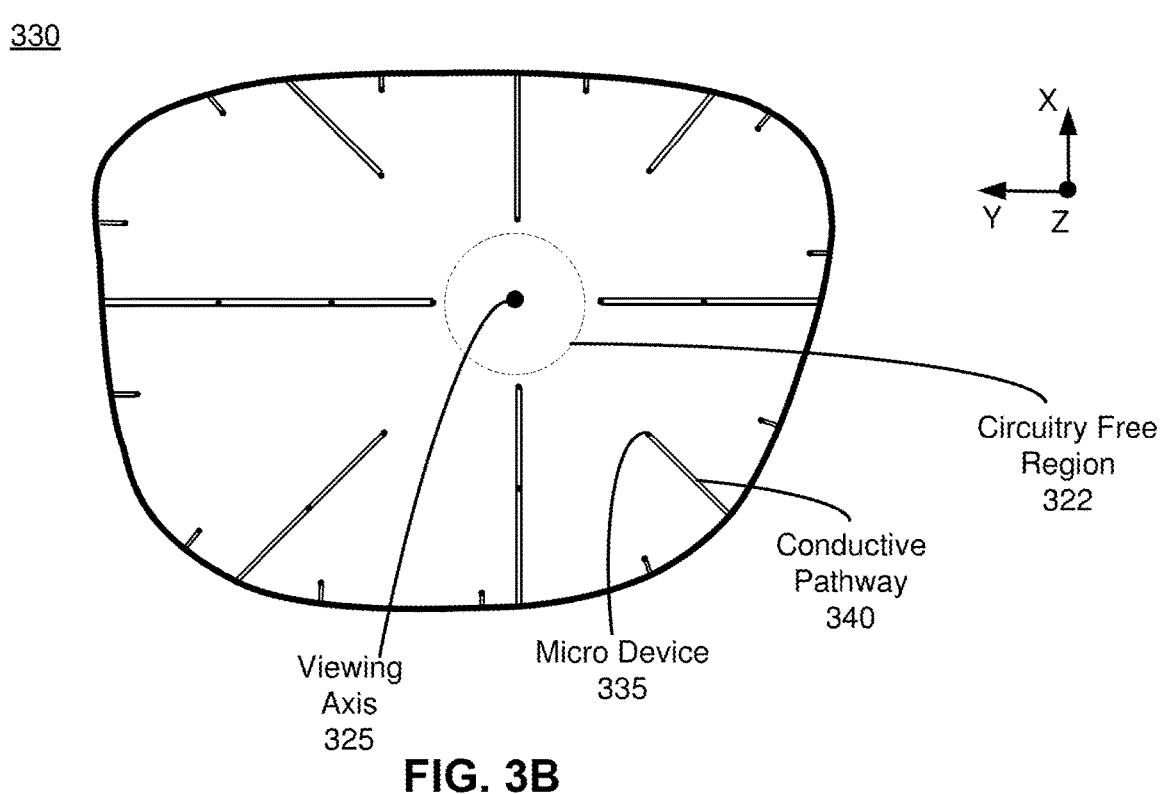
FIG. 3B is a plan view of an example illumination assembly with conductive pathways in a radial arrangement, according to one or more embodiments.

FIG. 3B is a plan view of an example illumination assembly 330 with conductive pathways in a radial arrangement, according to one or more embodiments. The illumination assembly 330 is substantially the same as the illumination assembly 300 except that the conductive pathways have a radial arrangement instead of an angled arrangement.

A radial arrangement of conductive pathways is such that each conductive pathway couples one or more sources in a straight line that is directed away from the viewing axis 325 in a generally radially manner. For example, a micro device 335 is coupled to a conductive pathway 340 that is directed in a radial manner away from the viewing axis 325. Note that a radial arrangement results in a relatively low spatial density of conductive pathways relative to the angled arrangement in FIG. 3A which can help mitigate chances of the conductive pathways becoming visible to the eye. Radial patterns have an advantage relative to linear circuit traces in improving see-through quality of the circuit board.

Figure 3C:
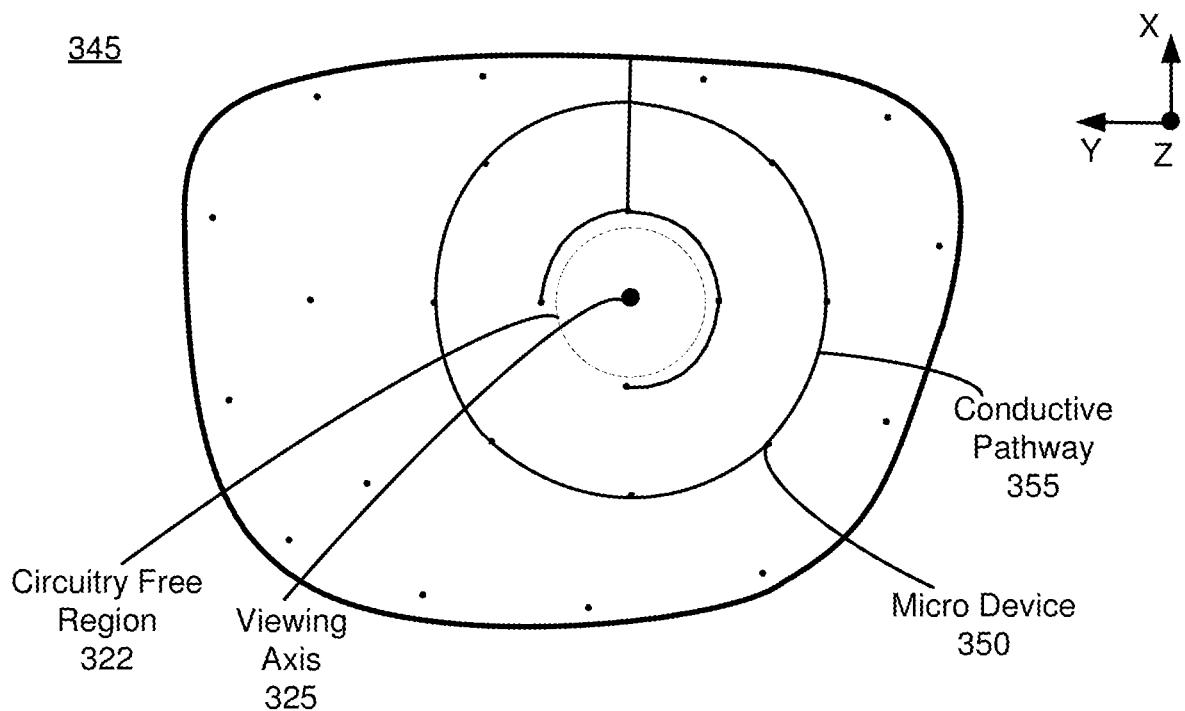
FIG. 3C is a plan view of an example illumination assembly with conductive pathways in a curved arrangement, according to one or more embodiments.

FIG. 3C is a plan view of an example illumination assembly 345 with conductive pathways in a curved arrangement, according to one or more embodiments. The illumination assembly 345 is substantially the same as the illumination assembly 300 except that the conductive pathways have a curved arrangement instead of an angled arrangement, and that for ease of illustration all of the conductive pathways are not shown.

A curved arrangement of conductive pathways is such that each conductive pathway couples one or more sources in using one or more curved lines that generally circumscribe the viewing axis 325. Additional details describing a curved arrangement may be found at, e.g., U.S. patent application Ser. No. 15/927,963, which is hereby incorporated by reference in its entirety. For example, a micro device 350 is coupled to a conductive pathway 355 that is curved and generally circumscribes the viewing axis 325. A curved arrangement results in a relatively low spatial density of conductive pathways relative to the angled arrangement in FIG. 3A which can help mitigate chances of the conductive pathways becoming visible to the eye. Circular patterns have an advantage relative to linear circuit traces in improving see-through quality of the circuit board. Diffraction effects of arcs/curves can be less noticeable to the user than linear circuit traces.

Figure 3D:
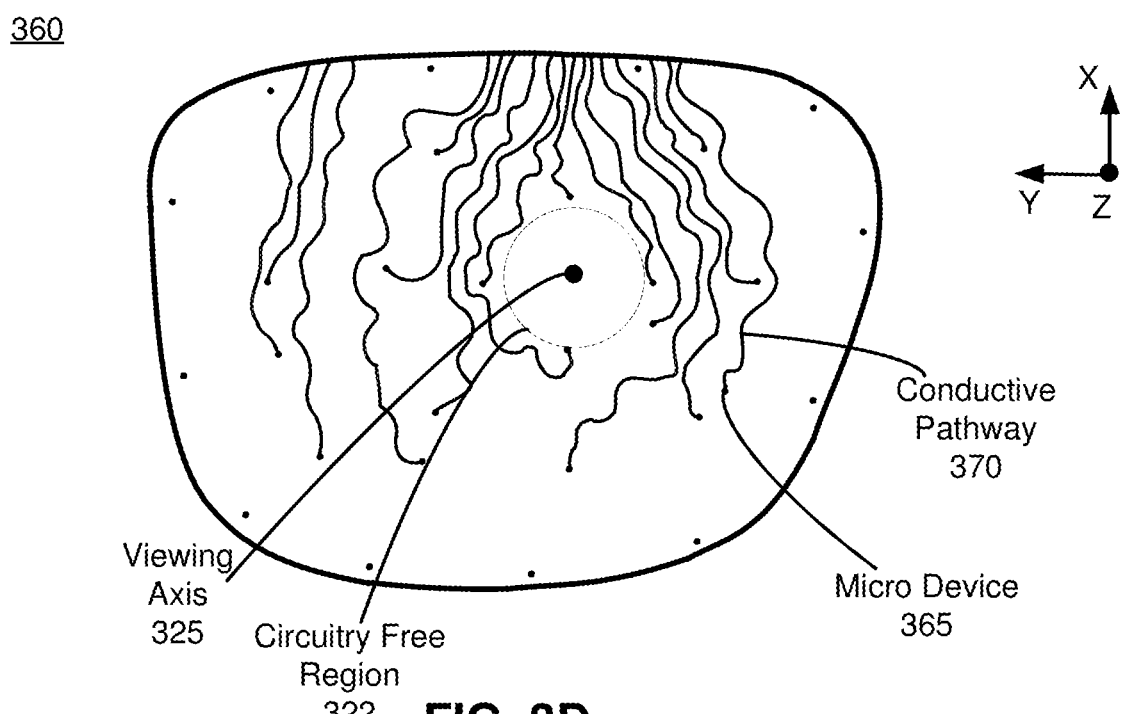
FIG. 3D is a plan view of an example illumination assembly with conductive pathways in a pseudo-random arrangement, according to one or more embodiments.

FIG. 3D is a plan view of an example illumination assembly 360 with conductive pathways in a pseudo-random arrangement, according to one or more embodiments. The illumination assembly 360 is substantially the same as the illumination assembly 300 except that the conductive pathways have a pseudo-random arrangement instead of an angled arrangement, and that for ease of illustration all of the conductive pathways are not shown.

A pseudo-random arrangement of the conductive pathways helps mitigate the conductive pathways becoming visible to the user. A human eye is generally more sensitive to straight lines and repeating patterns than it is to a randomized (or pseudo-randomized) pattern. Accordingly, arranging the conductive pathways in a pseudo-randomized manner uses the inherent operation of the eye to help mitigate visibility of the conductive pathways.

A pseudo-random arrangement of conductive pathways may be generated based on one or more randomization parameters and a randomization module. The randomization module operates as part of an illumination assembly manufacturing system. The randomization module uses the one or more randomization parameters to generate a design layout of conductive pathways arranged in a pseudo random manner. The randomization parameters include, e.g., positions of the plurality of sources, a period of a conductive pathway, an amplitude of the conductive pathway, a change in curvature of the conductive pathway, a minimum distance between adjacent conductive pathways, a randomness metric of the conductive pathway, some other parameter that randomization module uses to generate a design layout of conductive pathways arranged in a pseudo random manner, or some combination thereof. In some embodiments, the randomization module, for some or all of the conductive pathway, subject to the one or more randomization parameters, randomizes instances of, e.g., changes in amplitude, changes in period, changes in curvature, and changes in distance between adjacent conductive pathways, all per some variable distance along the conductive pathway, and the variable distance may be randomized as well. The resulting design can then be manufactured using the manufacturing system to produce an illumination assembly that includes conductive pathways that are arranged in a pseudo random manner (e.g., the illumination assembly 360). For example, the conductive pathways may be such that there is at least 1 mm between adjacent conductive pathways that are coupled to different devices (e.g., sources).

The illumination assembly 360 includes conductive pathways that are arranged in a pseudo-random manner. For example, a micro device 360 is coupled to a conductive pathway 370 using a conductive pathway that is pseudo-random. Note that the conductive pathway 365 has changes in period, amplitude, and curvature over its path to the micro device 365. Additionally, in this embodiment, the conductive pathway 370 is not the same shape as any of the other conductive pathways. As noted above, the pseudo-random arrangement of conductive pathways greatly mitigates chances of the conductive pathways becoming visible to a user. In the illustrated example the illumination assembly 360 includes a circuitry free region 322 that is centered on the viewing axis 325. In alternate embodiments, the illumination assembly 360 may not include a circuitry free region 322. In some embodiments, the pseudo-random patterns may be used in combination with linear and/or curved circuit patterns. For example, a lens may have linear and or curved shaped traces toward the edges of the lens, and pseudo random patterns toward the center of the lens.

In some embodiments, at least 50% of the length of a conductive pathway 370 has an effective length of no more than 10 mm with an effective radius of curvature of greater than more than 10 mm. In some embodiments, the effective length is no more than 5 mm and the effective radius of curvature is less than 5 mm. Functionally, the conductive pathway 370 should have a structure that makes it substantially less observable to the user than circuit patterns using longer effective lengths or curvature, or both, when looking at bright sources of light, for example a fluorescent light fixture, an MR16 lightbulb, or the sun.

Figure 4:
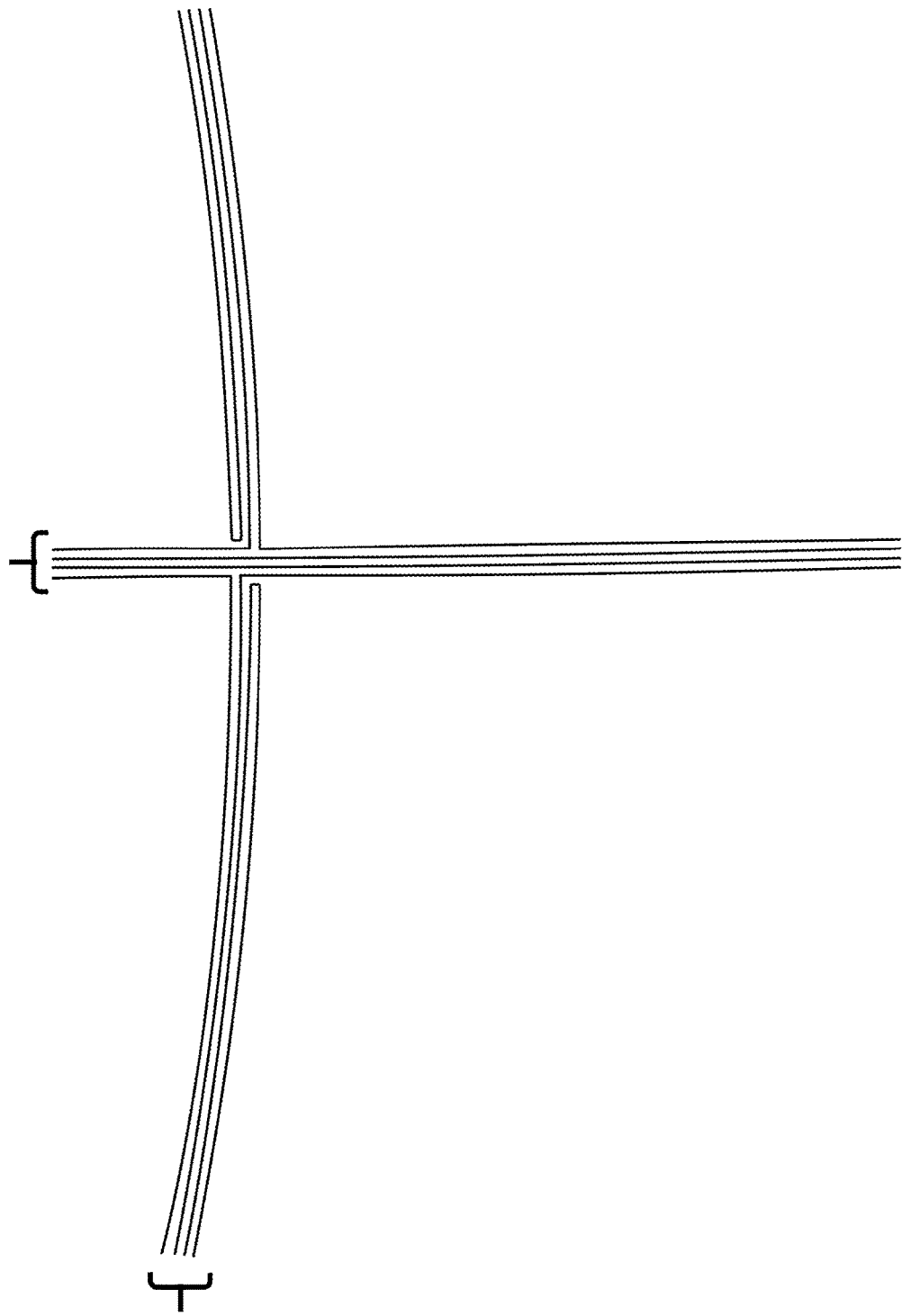
FIG. 4 is a front view of circuity that includes some micro devices coupled via conductive pathways, according to one or more embodiments.

FIG. 4 is a front view 400 of a portion of circuitry that includes some micro devices coupled via conductive pathways, according to one or more embodiments. The portion includes a conductive pathway 410, a conductive pathway 420, and micro devices 430a, 430b, and 430c. The portion is part of an illumination assembly that has conductive pathways arranged in a curved manner (e.g., as discussed above with regard to FIG. 3C). In this embodiment, the conductive pathway 410 includes a conductor 410a, and a conductor 410b, and the conductive pathway 320 includes a conductor 420a and a conductor 420b.

The conductive pathway 420 may act as a main trunk that electrically couples various rings of curved conductive pathways within an illumination assembly. For example, the conductor 420a may provide a control (and/or power) to micro devices and the conductor 420b may act as a return. The conductive pathway 410 forms a continuous ring, of which a portion is shown. Along the ring various micro devices (e.g., micro devices 430a-c) are coupled to the conductors 410a and 410b. The micro devices are selected from a group consisting of sources and sensors. Accordingly, the micro devices may be sources, sensors, or some combination thereof.

The circuitry 450 has the advantage of reducing power consumption. Because micro devices can be connected to different segments, the circuitry 450 allows selectively switching off some of the micro devices affixed to a substrate.

Circuitries for supplying current to micro devices include conductors that can be made of various materials such as metal (e.g., aluminum, copper, silver, nickel, gold, or alloys thereof), transparent conductive oxides (e.g., indium tin oxide, zinc oxide) or other conductors that are transparent to visible light, transparent polymers (e.g., Poly(3,4-ethylene-dioxythiophene) (PEDOT)), or nanoparticulate metal including ink. A metal conductor can be transparent and have a thickness less than a threshold thickness (e.g., about 50 nm.) A conductor can include a nanowire made of silver or other suitable materials.

Figure 5A:
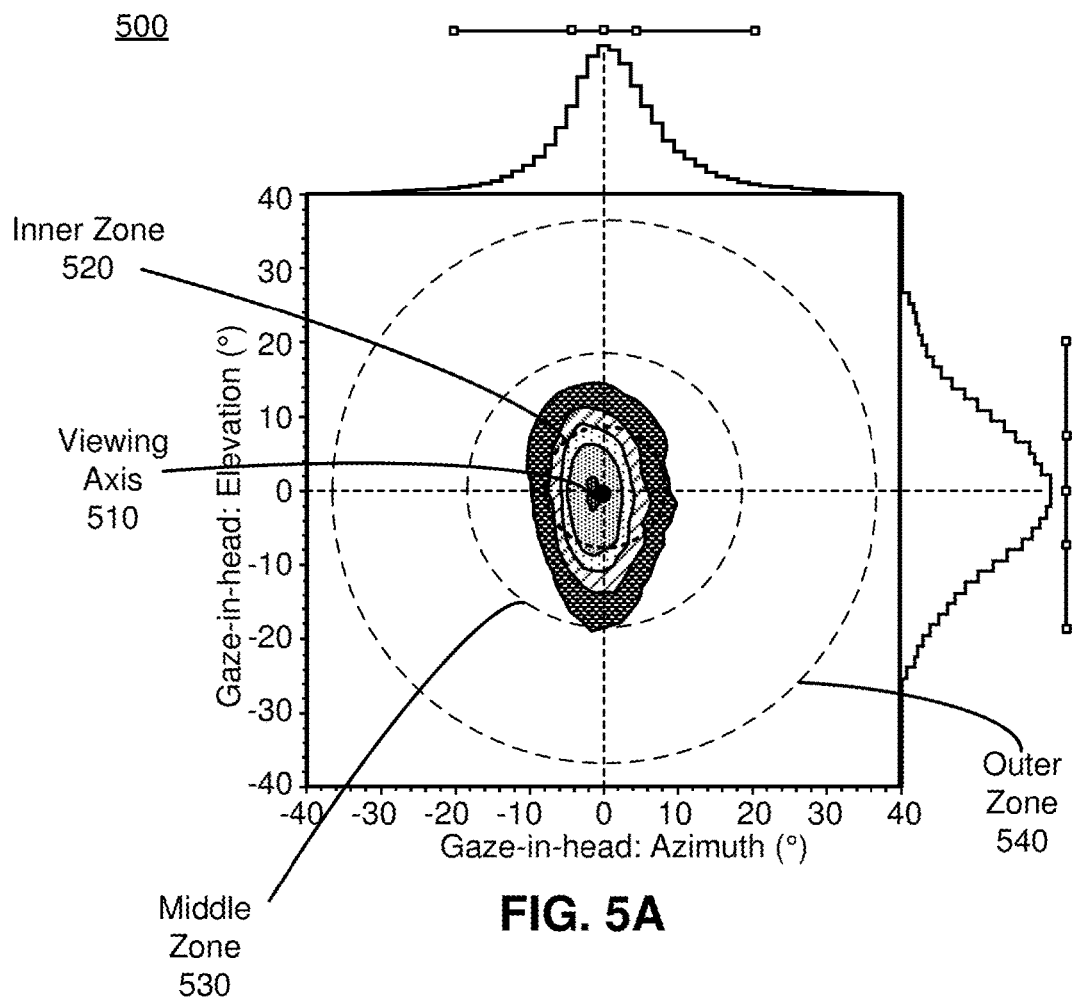
FIG. 5A is a plot of a distribution of gaze locations over a viewing region of a substrate over a period of time, according to one or more embodiments.

FIG. 5A is a plot 500 of a distribution of gaze locations over a viewing region of a substrate over a period of time, according to one or more embodiments. The gaze-direction distributions for azimuth and elevation angles were generated using eye tracking systems while averaging data for a number of users performing a wide variety of tasks. It is apparent from the plot 500 that users predominantly have gaze locations over a small region that surrounds a viewing axis 510 V. Given the distribution of gaze directions, one or more zones can be drawn that circumscribe the viewing axis. For example, the substrate 500 may be divided up into an inner zone 520, a middle zone 530, and an outer zone 540. The inner zone 520 is centered on the viewing axis 510. The middle zone 530 describes a region surrounding the inner zone 520 but not part of the outer zone 540. The outer zone 540 describes a region that is not part of the inner zone 520 nor the middle zone 530. In alternate embodiments, the inner zone 520, the middle zone 530, the outer zone 540, or some combination thereof, may be have different diameters and/or be shaped differently. The inner zone 520 may be selected such that is to be a circuitry free region (e.g., like the circuitry free region 250). A size and shape of each of the zones may be determined based in part on a desired portion of the gaze locations to fall within the zone. For example, the inner zone 520 may be sized and/or shaped to capture 80% of the gaze locations over a period of time. The middle zone 530 may be sized and/or shaped to capture 15% of the gaze locations over the period of time, and the outer zone 540 may be sized and/or shaped to capture the remaining 5% of the gaze locations.

Figure 5B:
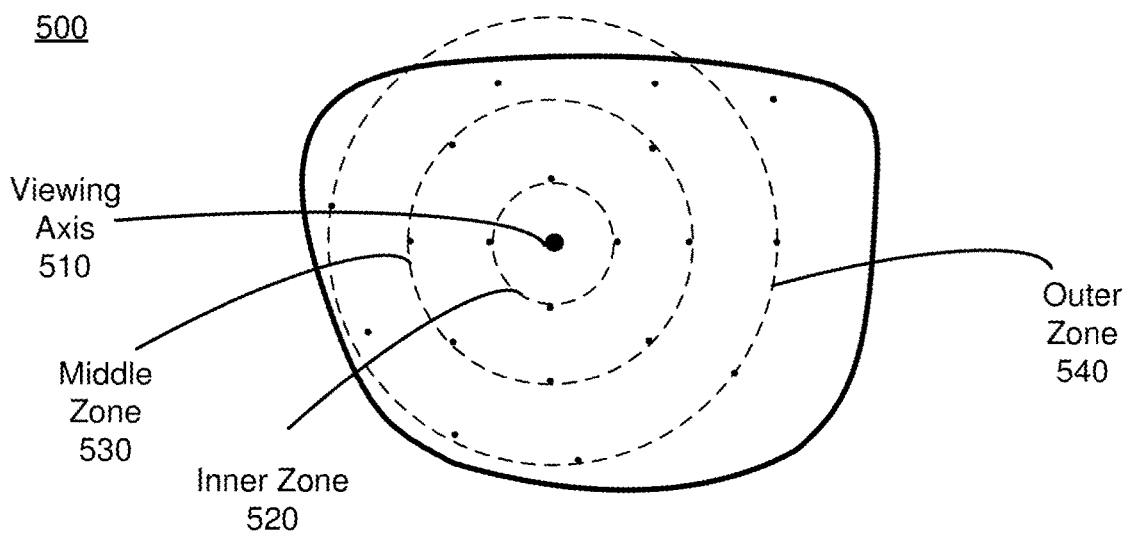
FIG. 5B is a plan view of a substrate design that includes a plurality of zones from FIG. 5A, according to one or more embodiments.

FIG. 5B is a plan view of a substrate design 500 that includes a plurality of zones from FIG. 5A, according to one or more embodiments. The plurality of zones are the same zones as described above with reference to FIG. 5A. A plurality of sources and conductive pathways (not shown) are added to the substrate design 500 based in part on the zones. For example, the inner zone 510 may be considered a circuitry free region such that no micro devices and conductive pathways may be placed within the inner zone 510. In some embodiments, the circuitry free region is at most 12 mm in diameter. Additionally, in some embodiments, a density of micro devices and/or conductive pathways may increase with distance from the viewing axis 510. For example, a density of micro devices and/or conductive pathways (collectively known as "features") can be higher in the middle zone 530 than in the inner zone 520 (which may be zero). Similarly, a density of features in the outer zone 540 can be higher than in the middle zone 530 and in the inner zone 520. The variable density of features can help mitigate chances of a feature becoming visible to a user during use of a NED.

Example of an Artificial Reality System

Figure 6:
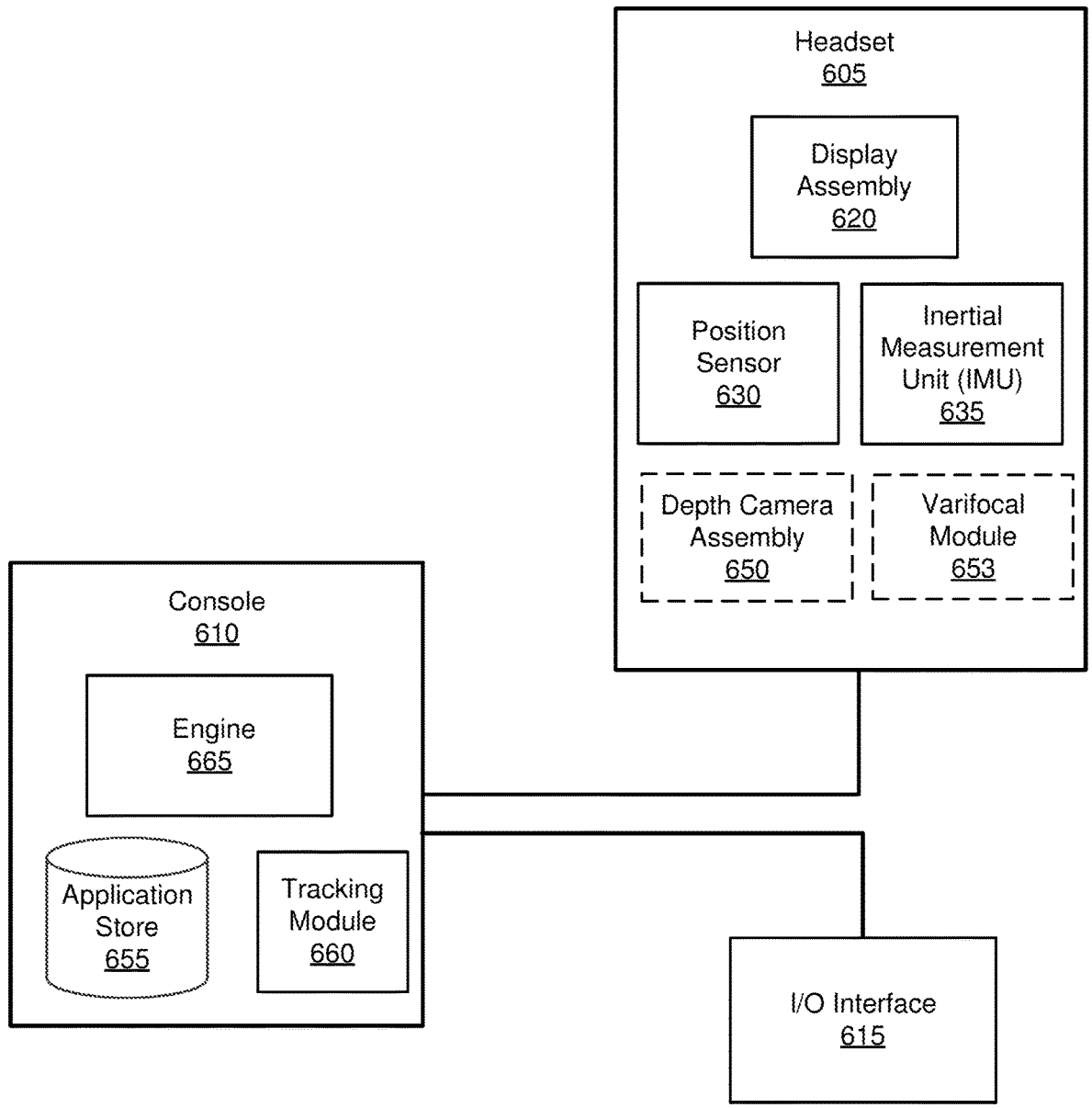
FIG. 6 is a block diagram of an example artificial reality system, according to one or more embodiments.

FIG. 6 is a block diagram of an artificial reality system 600, according to one or more embodiments. The system 600 may operate in e.g., a VR system environment, an AR system environment, a MR system environment, or some combination thereof. The system 600 shown by FIG. 6 comprises a headset 605, a console 610, and an input/output (I/O) interface 615. While FIG. 6 shows an example NED system 600 including one headset 605 and on I/O interface 615, in other embodiments any number of these components may be included in the system 600. For example, there may be multiple headsets 605 each having an associated I/O interface 615, with each headset 605 and I/O interface 615 communicating with the console 610. In alternative configurations, different and/or additional components may be included in the system 600. Additionally, functionality described in conjunction with one or more of the components shown in FIG. 6 may be distributed among the components in a different manner than described in conjunction with FIG. 6 in some embodiments. For example, some or all of the functionality of the console 610 is provided by the headset 605.

The headset 605 may be a HMD or a NED that presents content to a user comprising virtual and/or augmented views of a physical, real-world environment with computer-generated elements (e.g., two-dimensional or three-dimensional images, two-dimensional or three-dimensional video, sound, etc.). In some embodiments, the presented content includes audio that is presented via an external device (e.g., speakers and/or headphones) that receives audio information from the headset 605, the console 610, or both, and presents audio data based on the audio information. An embodiment of the headset 605 is the NED 100 described above in conjunction with FIG. 1A.

The headset 605 includes a display assembly 620. The headset may also include one or more position sensors 630, an inertial measurement unit (IMU) 635, an optional depth camera assembly (DCA) 550, and an optional varifocal module 653. Some embodiments of the headset 605 have different components than those described in conjunction with FIG. 6. Additionally, the functionality provided by various components described in conjunction with FIG. 6 may be differently distributed among the components of the headset 605 in other embodiments.

The display assembly 620 presents content to a user and monitors movement of the user over a target area. The display assembly 620 may be the display assembly 200. The display assembly 605 includes a display, an optics block, and an eye tracking system which are discussed in detail above with regard to FIG. 2. The display is the display 205, the optics block is the optics block 210, and the eye tracking system is the eye tracking system 215.

The optics block includes at least one illumination assembly. The illumination assembly is an embodiment of the illumination assembly 220. The illumination assembly is used to illuminate a target area in accordance with instructions from the eye tracking system. The target area is a portion of a user's face including one or both eyes (and in some cases portions of the face surrounding one or both eyes). The illumination assembly includes a plurality of micro devices that are in-field, and at least some micro devices are sources that illuminate the target area. The plurality of micro devices are controlled/powered using conductive pathways. The conductive pathways are arranged on a substrate of the illumination assembly in a particular manner (e.g., pseudo-random). Some example arrangements are discussed above with respect to FIGS. 2 and 3A-3D. Additionally, in some embodiments, the illumination assembly may include a circuitry free region along a view axis. The eye tracking system (e.g., the eye tracking system 215) captures images of the target area, and determines tracking information based on the captured images. The tracking information includes tracking information, and also may include face tracking information for portions of the face within the tracking area.

The IMU 635 is an electronic device that generates data indicating a position of the headset 605 based on measurement signals received from one or more of the position sensors 630 and from the depth information received from the DCA 650. A position sensor 630 generates one or more measurement signals in response to motion of the headset 605. Examples of position sensor 630 include: one or more accelerometers, one or more gyroscopes, one or more magnetometers, another suitable type of sensor that detects motion, a type of sensor used for error correction of the IMU 635, or some combination thereof. The position sensor 630 may be located external to the IMU 635, internal to the IMU 635, or some combination thereof.

Based on the one or more measurement signals from one or more position sensor 630, the IMU 635 generates data indicating an estimated current position of the headset 605 relative to an initial position of the headset 605. For example, the position sensor 630 include multiple accelerometers to measure translational motion (forward/back, up/down, left/right) and multiple gyroscopes to measure rotational motion (e.g., pitch, yaw, roll). In some embodiments, the IMU 635 rapidly samples the measurement signals and calculates the estimated current position of the headset 605 from the sampled data. For example, the IMU 635 integrates the measurement signals received from the accelerometers over time to estimate a velocity vector and integrates the velocity vector over time to determine an estimated current position of a reference point on the headset 605. Alternatively, the IMU 635 provides the sampled measurement signals to the console 610, which interprets the data to reduce error. The reference point is a point that may be used to describe the position of the headset 605. The reference point may generally be defined as a point in space or a position related to the NED's 505 orientation and position.

The IMU 635 receives one or more parameters from the console 610. The one or more parameters are used to maintain tracking of the headset 605. Based on a received parameter, the IMU 635 may adjust one or more IMU parameters (e.g., sample rate). In some embodiments, certain parameters cause the IMU 635 to update an initial position of the reference point so it corresponds to a next position of the reference point. Updating the initial position of the reference point as the next calibrated position of the reference point helps reduce accumulated error associated with the current position estimated the IMU 635. The accumulated error, also referred to as drift error, causes the estimated position of the reference point to "drift" away from the actual position of the reference point over time. In some embodiments of the headset 605, the IMU 635 may be a dedicated hardware component. In other embodiments, the IMU 635 may be a software component implemented in one or more processors.

In some embodiments, the headset 605 further includes the DCA 650. The DCA may be an embodiment of the DCA 115. The DCA 650 captures data describing depth information of the local area surrounding the headset 605. In embodiments not shown the DCA 650 is external to the headset 605 and captures images of the headset 605 within the local area. The DCA 650 uses one or more depth determination techniques to determine depth information. The depth determination techniques may include, e.g., structured light, stereo vision, time of flight, some other depth determination technique, or some combination thereof. The DCA 650 can compute the depth information using the data, or the DCA 650 can send this information to another device such as the console 610 that can determine the depth information using data from the DCA 650.

In some embodiments, the varifocal module 653 is integrated with the headset 605, and in particular, the display assembly 620. The varifocal module 653 may be coupled to an eye tracking system of the display assembly 620 to obtain tracking information. The varifocal module 653 may be configured to adjust a location of an image plane by adjusting a location of one or more elements (e.g., the display, the illumination assembly, some other optical element) within the display assembly and/or adjusting an optical power of one or more elements within the display assembly.

The varifocal module 653 may be also configured to adjust resolution of the image light emitted by the display by instructing the display to perform foveated rendering of the image light, based at least in part on the determined tracking information. The varifocal module 653 instructs the display to emit images with a maximum pixel density in a foveal region of the user's eye-gaze, an emit images with lower pixel densities in other regions.

The I/O interface 615 is a device that allows a user to send action requests and receive responses from the console 610. An action request is a request to perform a particular action. For example, an action request may be an instruction to start or end capture of image or video data or an instruction to perform a particular action within an application. The I/O interface 615 may include one or more input devices. Example input devices include: a keyboard, a mouse, a game controller, or any other suitable device for receiving action requests and communicating the action requests to the console 610. An action request received by the I/O interface 615 is communicated to the console 610, which performs an action corresponding to the action request. In some embodiments, the I/O interface 615 includes an IMU 635 that captures calibration data indicating an estimated position of the I/O interface 615 relative to an initial position of the I/O interface 615. In some embodiments, the I/O interface 615 may provide haptic feedback to the user in accordance with instructions received from the console 610. For example, haptic feedback is provided when an action request is received, or the console 610 communicates instructions to the I/O interface 615 causing the I/O interface 615 to generate haptic feedback when the console 610 performs an action.

The console 610 provides content to the headset 605 for processing in accordance with information received from one or more of: the DCA 650, the headset 605, and the I/O interface 615. In the example shown in FIG. 6, the console 610 includes an application store 655, a tracking module 660, and an engine 665. Some embodiments of the console 610 have different modules or components than those described in conjunction with FIG. 6. Similarly, the functions further described below may be distributed among components of the console 610 in a different manner than described in conjunction with FIG. 6.

The application store 655 stores one or more applications for execution by the console 610. An application is a group of instructions, that when executed by a processor, generates content for presentation to the user. Content generated by an application may be in response to inputs received from the user via movement of the headset 605 or the I/O interface 615. Examples of applications include: gaming applications, conferencing applications, video playback applications, or other suitable applications.

The tracking module 660 calibrates the NED system 600 using one or more calibration parameters and may adjust one or more calibration parameters to reduce error in determination of the position of the headset 605 or of the I/O interface 615. For example, the tracking module 660 communicates a calibration parameter to the DCA 650 to adjust the focus of the DCA 650 to more accurately determine positions of structured light elements captured by the DCA 650. Calibration performed by the tracking module 660 also accounts for information received from the IMU 635 in the headset 605 and/or an IMU 635 included in the I/O interface 615. Additionally, if tracking of the headset 605 is lost (e.g., the DCA 650 loses line of sight of at least a threshold number of structured light elements), the tracking module 660 may re-calibrate some or all of the NED system 600.

The tracking module 660 tracks movements of the headset 605 or of the I/O interface 615 using information from the DCA 650, the one or more position sensor 630, the IMU 635 or some combination thereof. For example, the tracking module 660 determines a position of a reference point of the headset 605 in a mapping of a local area based on information from the headset 605. The tracking module 660 may also determine positions of the reference point of the headset 605 or a reference point of the I/O interface 615 using data indicating a position of the headset 605 from the IMU 635 or using data indicating a position of the I/O interface 615 from an IMU 635 included in the I/O interface 615, respectively. Additionally, in some embodiments, the tracking module 660 may use portions of data indicating a position or the headset 605 from the IMU 635 as well as representations of the local area from the DCA 650 to predict a future location of the headset 605. The tracking module 660 provides the estimated or predicted future position of the headset 605 and/or the I/O interface 615 to the engine 665.

In some embodiments, the engine 665 generates a three-dimensional mapping of the area surrounding the headset 605 (i.e., the "local area") based on information received from the headset 605. In some embodiments, the engine 665 determines depth information for the three-dimensional mapping of the local area based on information received from the DCA 650 that is relevant for techniques used in computing depth. The engine 665 may calculate depth information using one or more techniques in computing depth from the portion of the reflected light detected by the DCA 650, such as stereo based techniques, the structured light illumination technique, and the time-of-flight technique. In various embodiments, the engine 665 uses the depth information to, e.g., update a model of the local area, and generate content based in part on the updated model.

The engine 665 also executes applications within the NED system 600 and receives position information, acceleration information, velocity information, predicted future positions, or some combination thereof, of the headset 605 from the tracking module 660. Based on the received information, the engine 665 determines content to provide to the headset 605 for presentation to the user. For example, if the received information indicates that the user has looked to the left, the engine 665 generates content for the headset 605 that mirrors the user's movement in a virtual environment or in an environment augmenting the local area with additional content. Additionally, the engine 665 performs an action within an application executing on the console 610 in response to an action request received from the I/O interface 615 and provides feedback to the user that the action was performed. The provided feedback may be visual or audible feedback via the headset 605 or haptic feedback via the I/O interface 615.

In some embodiments, the engine 665 can be configured to utilize, in association with the console 610 and the headset 605, the tracking information obtained from the eye tracking system for a variety of display and interaction applications. The various applications include, but are not limited to, providing user interfaces (e.g., gaze-based selection), attention estimation (e.g., for user safety), gaze-contingent display modes (e.g., foveated rendering, varifocal optics, adaptive optical distortion correction, synthetic depth of field rendering), metric scaling for depth and parallax correction (e.g., IPD and eye-box adjustment), etc. In some embodiments, based on information about position and orientation of the user's eye received from the eye tracking system, the engine 665 determines resolution of the content provided to the headset 605 for presentation by the display of the display assembly 620. The engine 665 provides the content to the headset 605 having a maximum pixel density (maximum resolution) on the display in a foveal region of the user's gaze, whereas the engine 665 provides a lower pixel resolution in other regions of the display, thus achieving less power consumption at the headset 605 and saving computing cycles of the console 610 without compromising a visual experience of the user. In some embodiments, the engine 665 can be configured to optimize the performance of other components of the headset 605 based on the tracking information obtained from the eye tracking system. In one embodiment, the engine 665 can instruct the varifocal module 653 to adjust a location of an image plane, e.g., to prevent vergence-accommodation conflict.

Additional Configuration Information

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. An assembly comprising:
   a transparent substrate including a first surface and a second surface opposite the first surface, the first surface including a viewing region through which light passes prior to reaching an eyebox; and
   a plurality of micro-devices coupled to respective conductive pathways that are affixed to the first surface, the respective conductive pathways arranged in a pseudo random manner that mitigates visibility of the conductive pathways by mimicking a vasculature of a human eye, wherein the plurality of micro-devices include at least one micro-device that is positioned within the viewing region and the pseudo random manner is governed by one or more parameters, the one or more parameters including a minimum distance between adjacent conductive pathways.

2. The assembly of claim 1, wherein the plurality of micro-devices include at least a plurality of sources.

3. The assembly of claim 2, wherein the viewing region is composed of a circuitry free region that is circumscribed by an outer region, and the plurality of sources and the conductive pathways are located in the outer region.

4. The assembly of claim 3, wherein the assembly is part of a head-mounted display (HMD) and the circuitry free region is associated with a center region of a field of view of the HMD.

5. The assembly of claim 3, wherein the circuitry free region has a diameter of at most 12 mm.

6. The assembly of claim 3, wherein the pseudo random manner is such that there is at least 1 mm between adjacent conductive pathways that are coupled to different sources of the plurality of sources.

7. The assembly of claim 3, wherein at least one source of the plurality of sources is positioned outside the viewing region.

8. The assembly of claim 3, wherein at least one of the plurality of sources is a vertical cavity emitting laser (VCSEL).

9. The assembly of claim 3, wherein the plurality of sources are configured to emit light having a wavelength in a near-infrared range.

10. The assembly of claim 1, wherein the one or more parameters further include one or more of: a period of a conductive pathway, an amplitude of the conductive pathway, a change in curvature of the conductive pathway, and a randomness metric of the conductive pathway.

11. The assembly of claim 1, wherein at least one of the conductive pathways is transparent in a visible band of light and overlaps the viewing region.

12. The assembly of claim 1, wherein at least one of the conductive pathways is opaque in a visible band of light and is outside the viewing region.

13. The assembly of claim 1, further comprising a coating layer that is transparent in a visible band, the coating layer at least partially enclosing at least some of the plurality of micro-devices and the transparent substrate.

14. An assembly comprising:
a transparent substrate including a first surface and a second surface opposite the first surface, the first surface including a viewing region through which light passes prior to reaching an eyebox, wherein the viewing region is composed of a circuitry free region that is circumscribed by an outer region; and
a plurality of sources coupled to respective conductive pathways that are affixed to the first surface in the outer region, the respective conductive pathways arranged in a pseudo random manner that mitigates visibility of the conductive pathways by mimicking a vasculature of a human eye, wherein the pseudo random manner is governed by one or more parameters, the one or more parameters including a minimum distance between adjacent conductive pathways.

15. The assembly of claim 14, wherein the circuitry free region is associated with a center region of a field of view of a head-mounted display.

16. The assembly of claim 14, wherein the circuitry free region has a diameter of at most 12 mm.

17. The assembly of claim 14, wherein at least a portion of the conductive pathways are straight.

18. The assembly of claim 14, wherein at least a portion of the conductive pathways are curved.

19. A near-eye display (NED), comprising:
an assembly comprising:
a transparent substrate including a first surface and a second surface opposite the first surface, the first surface including a viewing region through which light passes prior to reaching an eyebox,
a plurality of sources coupled to respective conductive pathways that are affixed to the first surface, the respective conductive pathways arranged in a pseudo random manner that mitigates visibility of the conductive pathways by mimicking a vasculature of a human eye, wherein the plurality of sources include at least one source that is positioned within the viewing region and the pseudo random manner is governed by one or more parameters, the one or more parameters including a minimum distance between adjacent conductive pathways; and
an eye tracking system comprising:
a camera assembly configured to record light emitted by the plurality of sources and reflected by an eye positioned at the eyebox.

* * * * *